Dec. 28, 1965 C. A. BEATY 3,226,656

VARIABLE FREQUENCY MICROWAVE CAVITY SIGNAL GENERATOR WITH REGULATED SUPPLY AND FEED-BACK COMPENSATION

Filed April 22, 1964

INVENTOR

Charles A. Beaty

BY

Glenn S. Ovrevik

AGENT

United States Patent Office 3,226,656

Patented Dec. 28, 1965

3,226,656

VARIABLE FREQUENCY MICROWAVE CAVITY SIGNAL GENERATOR WITH REGULATED SUPPLY AND FEED-BACK COMPENSATION

Charles A. Beaty, Tampa, Fla., assignor to RFD, Inc., Tampa, Fla.

Filed Apr. 22, 1964, Ser. No. 361,820
4 Claims. (Cl. 331—186)

This invention relates in general to microwave oscillators and in particular to variable frequency oscillators.

A multitude of oscillator devices for use at microwave frequencies are available in the prior art and have been utilized with varying degree of success in diverse microwave applications. A great number of these devices are designed for direct energization of waveguide systems while others provide a TEM mode output for feeding via coaxial transmission line. Many of these devices are extremely bulky and complex and are characterized by frequency drift, noise and energy source fluctuation problems and are further complicated by linearity considerations as the output power and/or frequency is varied.

Accordingly;

It is an object of this invention to provide a compact, low noise microwave oscillator which affords a low noise TEM mode output.

It is another object of this invention to provide an improved microwave oscillator which affords a substantially constant power output as the output frequency is varied.

It is a further object of this invention to provide an improved microwave oscillator which is relatively inexpensive to manufacture and which is highly reliable over extended periods of time.

Other objects of the invention will become apparent upon a more comprehensive understanding of the invention for which reference is had to the following specification and drawings wherein identical elements are similarly identified.

Briefly, the device of this invention is a microwave oscillator of the cavity variety which incorporates a series regulated power source with several feedback means including a low frequency modulation means by which the power source output is controlled.

Figure 1:
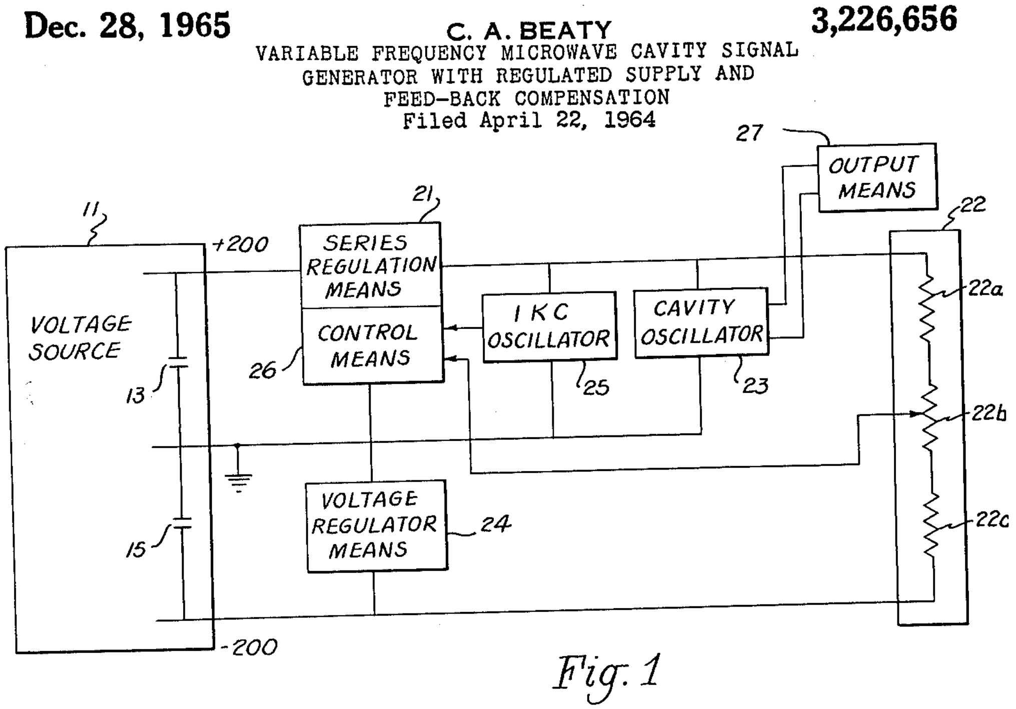
FIGURE 1 is a schematic block diagram showing of one embodiment of the oscillator of this invention.

In FIGURE 1, the output of an A.C. source, indicated at 11, is converted, by one half wave rectifier 12 and the smoothing capacitor 13 connected to ground, into a D.C. voltage with a minimum A.C. ripple measured across the capacitor 13. Likewise, a second one half wave rectifier of opposite polarity 14 and its associated smoothing capacitor 15 also serves to convert the output of A.C. source into a D.C. voltage of negative polarity measured across the capacitor 14, thus affording a voltage doubling action measurable across the capacitors 13 and 15 in series.

Series regulator means 21, which may be a triode vacuum tube wherein the impedance of the cathode to plate path in the triode is a function of input grid current, interconnects the ground isolated terminal of capacitor 13 and one end terminal of tapped load impedance means 22. The other end terminal of the impedance means 22 is directly connected to the ground isolated terminal of capacitor 15 such that the series regulator means 21 serves to connect the load impedance means 22 across the capacitors 12 and 15 in series.

Cavity oscillator 23, which is adapted to produce a relatively high frequency of predetermined level when appropriately energized, is connected across the capacitor 13 via the series regulator means 21 such that the voltage applied across the cavity oscillator 23 is a function of the series regulator 21 impedance. The cavity 23 is tunable over the desired frequency range by conventional tuning means, such as the varying of the cavity dimensions.

In accordance with the general regulation requirements of the invention, a voltage regulator means 24 is connected across the capacitor 15 such that the voltage at one terminal end of the load impedance means 22 is effectively fixed with respect to ground. Thus the voltage with respect to ground at the top of section 22B may be accurately determined for any selected position of the tap. The signal generator of the present invention may operate with internal modulation provided by a 1 kc. oscillator 25 or without internal modulation when external modulation of the output is desired. Ganged switches 44*a* and 44*b* control the operation of oscillator 25 such that the oscillator is operative to provide internal 1 kc. modulation when switches 44*a* and 44*b* are closed. No internal modulation is present when switches 44*a* and 44*b* are open.

In this embodiment two feedback control circuits are provided to insure a controlled voltage across the cavity oscillator 23 and thus a precise output therefrom regardless of whether switches 44*a* and 44*b* are closed to provide internal modulation, or open to provide no modulation. Each of these feedback circuits is connected to control means 26 such that the signal fed back controls the series impedance 21. One feedback path, via the load impedance 22B center tap, provides a negative voltage feedback and the other feedback path, via the oscillator 25 provides a positive voltage feedback. As will be explained in more detail hereinafter, the first mentioned feedback path accommodates both high and low frequency variations in the absence of the 1 kc. oscillator 25 and is adapted to respond solely to low frequency variation when the 1 kc. oscillator 25 is in operation. The oscillator 25 is likewise adapted to accommodate high frequency variations when in operation.

It will be noted that the load impedance means 22 in the depicted embodiment consists of three serially connected sections 22A, 22B and 22C wherein the section 22B is a shunted potentiometer and the impedance of the voltage at the tap on the potentiometer is always negative with respect to ground irrespective of the position of the tap.

Figure 2:
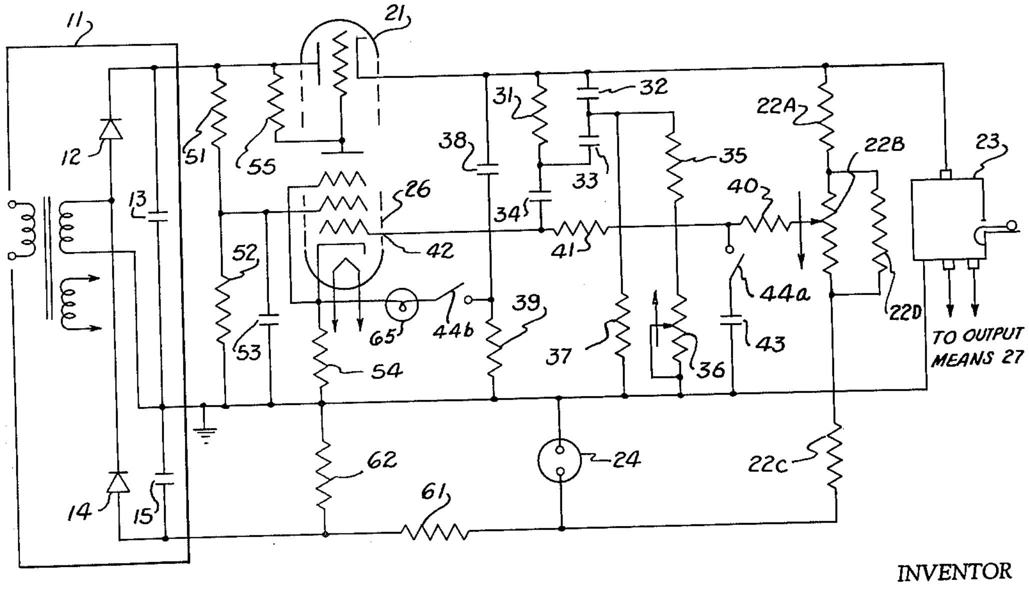
FIGURE 2 is a more detailed schematic showing of the embodiment of FIGURE 1.

The preferred embodiment of FIGURE 1 may be better understood by reference to the schematic showing in FIGURE 2.

In FIGURE 2, the triode section of a type 6GE8 tube is utilized as the series regulator means 21 and the pentode section of this tube serves as the control means 26. The tap on potentiometer 22B is connected to the control grid 42 of the pentode control means 26 to provide a negative feedback thereto via series impedance means 40 and 41 which are incorporated for voltage drop purposes. A high frequency bypass means, the switch 44*a* and capacitor 43, which may be, for example a 400 v., .01 $\mu$f. capacitor, serves to bypass to ground high frequency variations at the tap of potentiometer 22B when the switch 44A is closed.

The resistance 31 and capacitors 32, 33 and 34, together with resistance 35, 36 and 37, form the oscillator 25 of FIGURE 1. It will be appreciated that this R.C. network affords a relatively low impedance path between the plate of the triode 21 and the grid of the pentode 26 at the oscillator frequency, 1 kc. Thus a relatively low magnitude positive voltage feedback is provided at this frequency. In operation of the oscillator 25, shown in FIGURE 2, frequency is controlled by varying the impedance of the potentiometer 36, but other components, for example, resistance 31 or capacitor 34, may be varied to change frequency, if desired. In such alternative, an increase in resistance or a reduction in capacitance would serve to raise the oscillator frequency.

In accordance with the depicted embodiment of this invention, the switch means 44*a* and 44*b* may be ganged and may be automatically controlled by conventional means not shown such that both switches are open in the absence of the 1 kc. output of oscillator 25, and both switches are closed in the presence of the 1 kc. output. As discussed briefly heretofore, the switch 44*a*, when closed, serves to bypass high frequency variation of the feedback voltage at the tap of potentiometer 22B but does not disturb the low frequency characteristic of the feedback voltage, that is, the gradual variation thereof.

The switch 44*b* is serially connected with filamentary element 65, which may be, for example, a filamentary lamp having a 3 watt rating, between the cathode of the pentode 26 and the midpoint of capacitor 38 and resistance 39 in series across the cavity oscillator 23. It will be appreciated that the series connection of capacitor 38 and resistance 39 is subject to the same voltage applied across the oscillator 23 and that variations in this applied voltage appear at the midpoint of the series connection. Thus when the switch 44*b* is closed, the cathode voltage of the pentode 26 is a function of the element 65 impedance and varies at a rate dependent upon the magnitude of the variations at the midpoint, to lower or increase the cathode potential in accordance with the voltage applied across the oscillator 23. Consequently, the positive feedback to the grid of pentode 26 and the cathode potential thereof vary in synchronism, and the grid cathode bias is maintained within selected limits. It will be appreciated, of course, that any type of element having the impedance characteristic of a filamentary element, that is, an increase in resistance as the element is energized, may be subsituted for the lamp 65 shown in FIGURE 2.

It has been found that the device of this invention affords a precision microwave oscillator which is operative over a variety of different frequency bands. For example, it has been found that this device is adaptable to L, S, C and X band applications without significant circuit alteration other than component values. Moreover, the device is relatively lightweight (5 pounds) and may be housed in a space no greater than 7 inches by 6 inches by 6 inches, if desired.

The device of this invention may be designed for various wattage ratings, of course, and has been successfully operated at 40 mw. and more. In addition, it has been found that compared with conventional klystron oscillators, the device of this invention decreases the noise level by approximately 40 db.

It will be appreciated that numerous modifications of the exemplary embodiment in accordance with conventional techniques would be obvious to those skilled in the art and that such modifications, either specifically referred to or otherwise, are considered wthin the purview of this disclosure. For example, it is not essential that the load impedance 22 comprise three separate impedances nor that the impedance be resistive in nature.

Likewise, it is not essential that the oscillator 25 be of the variety derived from a parallel T type of filter provided, of course, the circuit exhibits a low impedance path when in oscillation at the prescribed frequency.

Finally, it is understood that this invention is only to be limited by the scope of the claims appended hereto.

What is claimed is:

1. A microwave signal generator comprising a D.C. voltage source having output terminals across which an output voltage may be taken, one of said terminals including variable impedance means in series therewith, said variable impedance means being of the electron tube variety having at least cathode, control grid, and plate electrodes with a cathode to plate impedance path which is variable in impedance in accordance with the voltage applied to said control grid; voltage amplifier means having at least cathode, control grid, screen grid and plate electrodes and adapted to change the voltage applied to said control grid of said variable impedance means in response to voltage variations at said control grid of said voltage amplifier means; center tapped load impedance means; means electrically connecting said load impedance means across said output terminals of said voltage source such that said variable impedance means and said load impedance means are in serial connection; microwave cavity oscillator means adapted to oscillate when energized by a D.C. voltage of at least a selected magnitude; means electrically connecting said microwave oscillator means across said output terminals of said voltage source such that said variable impedance means and said microwave oscillator means are in serial connection; negative feedback means interconnecting said center tap of said load impedance means and said control grid of said voltage amplifier means such that the impedance of said variable impedance means varies directly as the voltage of said center tap; frequency determining circuit means adapted to resonate at a frequency substantially below the microwave range; means electrically connecting said frequency determining circuit means between said plate electrode of said variable impedance means and said control grid of said voltage amplifier means such that said frequency determining circuit and said voltage amplifier means will oscillate at said frequency substantially below the microwave range; and means for varying the cathode potential of said voltage amplifier means in accordance with variations in voltage fed back to said control grid thereof from said plate electrode of said variable impedance means via said frequency determining circuit means.

2. A signal generator as defined in claim 1 wherein said means for varying the cathode potential includes center tapped voltage divider means and negative feedback means interconnecting said center tap of said voltage divider and said cathode of said voltage amplifier.

3. A signal generator as defined in claim 2 wherein said negative feedback means interconnecting said center tap on said voltage divider and said cathode of said voltage amplifier is a filamentary element.

4. A signal generator as defined in claim 3 wherein said filamentary element is filamentary lamp.

References Cited by the Examiner

UNITED STATES PATENTS 2,492,168 12/1949 Marker ------------ 331—186

ROY LAKE, *Primary Examiner.*

J. KOMINSKI, *Assistant Examiner.*